United States Patent
Agraharam et al.

(10) Patent No.: US 6,240,462 B1
(45) Date of Patent: May 29, 2001

(54) SYSTEM FOR PROVIDING ENHANCED GRADE OF SERVICE FOR CONNECTIONS OVER A LARGE NETWORK

(75) Inventors: Sanjay Agraharam, Marlboro; Antonio DeSimone, Ocean; Ashok K. Kuthyar, Holmdel; Ram S. Ramamurthy, Manalapan; Sandeep Sibal, Matawan, all of NJ (US)

(73) Assignee: AT&T, New York, NY (US)

( * ) Notice: Subject to any disclaimer, the term of this patent is extended or adjusted under 35 U.S.C. 154(b) by 0 days.

(21) Appl. No.: 08/950,021

(22) Filed: Oct. 14, 1997

(51) Int. Cl.[7] ................................................. G06F 13/00
(52) U.S. Cl. ................................. 709/238; 370/238
(58) Field of Search ....................... 395/200.48, 200.49, 395/200.47; 709/218, 219, 217, 239, 238; 379/221; 370/238

(56) References Cited

U.S. PATENT DOCUMENTS

| | | | |
|---|---|---|---|
| 5,694,549 | * 12/1997 | Carlin et al. | 709/250 |
| 5,732,078 | * 3/1998 | Arango | 370/355 |
| 5,845,073 | * 12/1998 | Carlin et al. | 709/217 |
| 5,862,339 | * 1/1999 | Bonnaure et al. | 709/227 |
| 5,905,872 | * 5/1999 | DeSimone et al. | 709/245 |
| 5,933,425 | * 8/1999 | Iwata | 370/351 |
| 5,933,490 | * 8/1999 | White et al. | 379/221 |
| 5,940,372 | * 8/1999 | Bertin et al. | 370/238 |
| 5,953,312 | * 9/1999 | Crawley et al. | 370/218 |
| 6,084,858 | * 7/2000 | Matthews et al. | 370/238 |

OTHER PUBLICATIONS

David Lewis et al.; Multi–Service Management in a Multi-–Provider Environment; Fifth IEE Conference on Telecommunications; pp. 292–296, 1995.*

* cited by examiner

Primary Examiner—Kenneth R. Coulter
(74) Attorney, Agent, or Firm—Kenyon & Kenyon

(57) ABSTRACT

We have realized that for a connection over a large data network, such as an Internet connection that couples a web access device to a terminal server connected to an applications server, delays associated with the process of downloading large data files over such a connection, occur primarily in the leg of the connection that couples the applications server to a terminal server while little congestion is typically observed in the leg of the connection that couples the Internet access device to the terminal server. The aforementioned delay is reduced by establishing a separate connection from the applications server to the Point Of Presence server outside or independently of the backbone of the large data network thereby allowing users to receive enhanced grade of service for file transfer operations.

28 Claims, 3 Drawing Sheets

SYSTEM FOR PROVIDING ENHANCED GRADE OF SERVICE FOR CONNECTIONS OVER A LARGE NETWORK

BACKGROUND OF THE INVENTION

The present invention relates generally to a method for providing enhanced quality of service for networks, and more particularly to a method for providing enhanced quality of service for a client device that accesses a network via a single connection to a Point Of Presence server.

Many users connect to the Internet, also known as "world wide web", via a switched communication line coupled to a dial-up modem. As used herein the term Internet refers to a large distributed network comprised of interconnected processors (servers) and routers wherein data passes through several routers, before reaching its intended destination (e.g., an applications server). For Internet access devices, such as a personal computer or so-called "web television" device, the entry point to the Internet is usually a Point Of Presence (POP) terminal server. From the POP terminal server, the user of the device can access any applications server in the network.

Today, many users are attempting to transfer to their web access devices, large amounts of data or files, such as Hyper Text Markup Language (HTML) text, graphics or animated image files using formats such as, Graphics Interchange Format (GIF) files, real time audio files or multimedia (video and audio) files. These files are typically very large, bit-intensive files. As used herein the term "download" refers to a file transfer from the applications server through the Internet or other large distributed network, to the POP terminal server and from the POP terminal server to the user.

One of Internet users' most common complaints is the delay experienced by dial-up modem Internet users in their attempt to download bit-intensive files to their web access devices. The aforementioned delay is sometimes so severe that the process of downloading audio and video information is frustrating to the point that dial-up modem Internet users end up terminating the process before most of the file is downloaded. In summary, almost all Internet access providers are unable to guarantee to their subscribers a given (QOS) Quality of Service (i.e., performance requirement for delivery of data within a given time window).

In response to this problem, many solutions have been proposed to guarantee a given QOS for Internet service. For example, some systems engineers have suggested that timely data delivery over the Internet can be achieved by significantly increasing the bandwidth of the links in the shared IP backbone. Unfortunately, even an over-engineered Internet backbone may not result in smooth transfers of real-time information (e.g., audio and video) due to the inherent nature of the IP protocol itself which allows only "best effort" attempts at data delivery.

Another technique for solving the delays inherent in transferring data from an applications server to a web access device involves the use of an additional, separate plain old telephone service (POTS) circuit-switched connection to couple the applications server to the web access device. While useful, this technique requires a user to have two individual telephone lines and two separate modems, both of which being available at once. Unfortunately, most users do not have this capability. Thus, a problem of the prior art is the lack of an efficient, cost-effective and practical method for significantly reducing delay over a connection that couples a web access device to an applications server.

SUMMARY OF THE INVENTION

We have realized that for a connection that couples a web access device to an applications server via a POP terminal server, the leg of the connection that extends from the web access device to the POP terminal server is more often than not congestion-free while the leg of the connection that couples the POP terminal server to the applications server is prone to heavy traffic density that causes intolerable delay for large file transfer.

The present invention is directed to a method and a system for quicker transfer of information from an applications server to a web access device. The quicker information transfer is accomplished by bypassing the typically congested IP backbone to establish a separate connection that extends from the applications server to a Point Of Presence (POP) terminal server that is coupled to the web access device. The connection may be for example, a circuit switched ISDN connection associated with another network that is logically separated from the backbone of the IP network. Other alternate paths for such a connection include a logical communications path within an Asynchronous Transfer Mode (ATM) network with QOS feature, a logical communications path within another IP network that is RSVP-enabled internally between routers, a link within a Frame Relay network, or simply a communications path within any other packet-switched or circuit-switched network that may be less congested.

According to a feature of the present invention the request and data paths are separated within the network so that there are two distinct unidirectional paths, one from the Point Of Presence (POP) terminal server to the web applications server via the IP backbone using IP protocols, and the other path being, for example, a circuit-switched ISDN connection coupling the applications server to the POP terminal server.

According to one embodiment of the present invention, an applications server to which a query is directed by a web access device, communicates with a Generalized Address Resolution Protocol Server (GARPS) resident within the IP network to determine the optimum path for downloading requested data to a particular POP terminal server. The GARPS maps IP addresses to a subnet address, which is a combination of a selected subnetwork (POTS, ISDN, ATM, RSVP network, etc.) and the address within that network for the machine identified by the IP address. According to the present invention, any device on the network can use the GARPS find out the best subnet to choose when setting up a QOS path to another device.

According to another feature of the present invention, the optimum subnet is chosen based on several key factors, such as: a) the ability to support the QOS desired by the user on that network; b) the current traffic load on that subnetwork; c) the price/payment that the user is willing to pay for that service; and d) the time of day variations that the subnetworks experience.

According to yet another feature of the present invention, the optimum subnet will be made available by the GARPSes, and its identity will be stored in a database that will be dynamically updated based on the above criterion. In the event that none of the alternate subnets are available, the default IP backbone network would be used.

DETAILED DESCRIPTION

Figure 1:
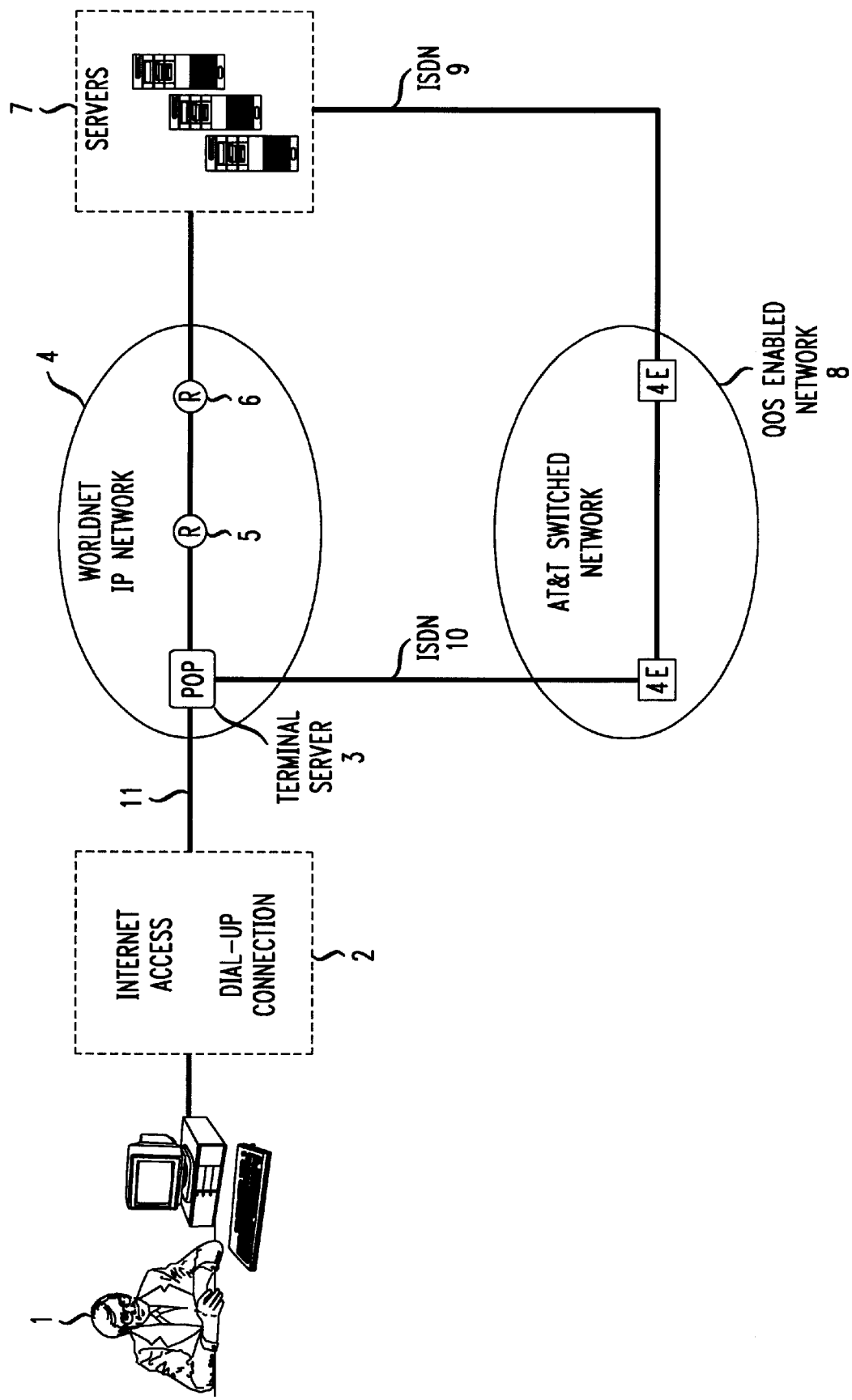
FIG. 1 depicts the architecture of the system of the present invention.

When downloading large data files from an applications server on the Internet, most of the delay is due to the delays in the network as the file is transferred in packets from the applications server to the Point Of Presence (POP) terminal server. Furthermore, these delays are not very predictable, which means that the user simply looks at his screen and waits until more data is transferred. Once the data reaches the POP terminal server, the delay is relatively short and very predictable based on the file size.

Connection Management Information Transfer

One technique for overcoming this bottleneck (which has been disclosed in an earlier application by some of the same inventors, entitled "Method of Transferring Connection Management Information in World Wide Web Requests and Responses," Ser. No. 08/744,232, and which is hereby incorporated by reference as if repeated herein in its entirety, including the figures) transfers connection management information between Web clients and servers by means of messages incorporated in optional header fields of the HTTP protocol header; the HTTP protocol being protocol through which web clients and servers communicate with each other. These fields in an HTTP message carry information related to connection management that is used for direct communication between the client and server along alternative paths that provide a QOS greater than what can be achieved over the Internet.

The connection management information, incorporated within optional header fields of the HTTP protocol header, includes addressing information which specifies addresses on a subnetwork, such as ATM addresses, ISDN or POTS E.164 numbers, as well as an alternate Internet Protocol (IP) address that may be used to communicate over non-persistent or switched paths. In addition, the addressing information includes the subnetwork type in which the addresses are applicable. Examples of the latter may include the IEEE 802 family of networks (e.g., Ethernet or token-ring), Emulated LAN (ELAN) ATM, ISDN, FR (Frame Relay), and X.25 virtual circuit networks. Further, for those subnetworks for which QOS can be controlled, such as ATM or FR networks, the connection management information transmitted in the header fields can also include QOS information such as a required bandwidth, maximum variance of packet delay, maximum packet loss, and preferred Socket type (e.g., datagram (UDP), or stream (TCP)).

The optional headers in the HTTP message containing the connection management information may be inserted by a server, a client, or an intermediate system on behalf of the client, the latter referred to as a proxy on the World Wide Web (WWW). The HTTP messages are initially delivered over a router network (e.g., the Internet), using multiple router hops rather than a direct connection between the communication endpoints. The Web client or server endpoint then uses the additional addressing information contained in the header to establish a direct connection to the other endpoint to provide services (e.g., the delivery of information) on the direct network connection. As an alternative, the address information provided to the other end can be of an intermediate system (IS), such as the proxy of a specialized router node, and rather than a direct connection between the two endpoints, one of the original endpoints may establish a direct connection on the subnetwork with the intermediate system. When the underlying subnetwork is capable of acting upon QOS information, QOS information included in the header may be used by either a client, or a proxy acting on behalf of the client. A program running on the client or proxy interprets the QOS response information, and indicates with what QOS a direct connection (known as a cut-through) between client and server is to be undertaken.

Generalized Address Resolution Server

One embodiment of the present invention to reduce the bottleneck in transferring large amounts of data over the Internet (or any large distributed network) uses a Generalized Address Resolution Protocol Server (GARPS) resident within the network by which other devices in the network can obtain routing information for downloading data. The GARPs maps IP addresses to a "subnet address," which is a 2-tuple of the subnetwork (phone, ISDN, ATM, RSVP, network, etc.) chosen and the address within that network for the machine identified by the IP address. Any device can use this to find out the optimum (i.e., the most appropriate) subnetwork to choose when setting up a QOS path to another device.

According to the present invention, the optimum subnetwork is a function of the following criterion:

a) ability to support the QOS desired by the user on that network;
b) traffic load on that subnetwork;
c) price/payment for that service (which could be negotiated with the client or the server) that the user is willing to pay;
d) time of day variations (load-balancing at a gross level) that the subnetworks experience. Busy hours peak at different times on different subnetworks.

According to the present invention the optimum subnetwork will be made available by the GARPSes, and will be stored in a database that will be dynamically updated based on the above criterion. In the event that none of the alternate subnets are available, the default IP network would be used (with a suitable warning). In the other embodiment, this information is wrapped inside the request sent out by the client. However, the use of the GARPs allows greater flexibility, and does not require either:

the client to know the subnet address;
the network to wrap the subnet address inside the client's request (thereby modifying the request) using a proxy of some sort at the client POP.

Much like Address Resolution Protocol (ARP), which is used currently in the IP world to populate mappings between IP addresses and their MAC addresses (a kind of subnet address), GARP or proxy GARP is a protocol that dial-in customers can use to access to any of these subnetworks directly. For instance, if a client has another phone line connected on another PPP interface, a GARP message could be sent out that essentially says:

map: myIP address→(phone-subnetwork, myPhoneNumber) the GARP message would also specify the QOS that the subnet can support (14.4 or 28.8 kbps etc.). Furthermore, the users can access the GARP server and its database to create their profile, which is then used to determine the optimum subnetwork. For example, the user can indicate that he has access to a particular ATM network and the associated address on that network. Then, when attempting to determine which subnetwork to download the data over, the GARP server will examine the particular user's profile, apply the above mentioned criteria, and depending on the right circumstances, may choose the particular ATM network.

While the exact location of the GARP server on the network is not important, what is important is that the destination server, which is to download the data, must have connectivity to the GARP server. Thus, once a request to download data is received by a destination server that has been configured to search for an optimum alternate path, the destination server will contact the GARP server, determine the optimum path for the designated user or POP terminal server, and send the data over that route.

The present invention therefore reduces the delay inherent in the transfer of the file from the applications server to the POP terminal server by establishing an alternate connection, such as a circuit switched connection, from the web applications server to the POP terminal server outside the IP network and over an alternate infrastructure instead of via the IP backbone.

The present invention enables service providers the ability to guarantee performance for all user requested information—HTML, text, graphics, images and real-time multimedia content. The present invention utilizes the existing POTS infrastructure to deliver content taking advantage of the fact that peaks of voice traffic and Internet traffic occur at different times, i.e., voice traffic peaks occur during business hours (9–5), whereas Internet traffic peaks occur during the early evening hours (7–10 p.m.). As a result, there exists excess capacity in the circuit switched network when the IP backbone is full, which is precisely when attempts to download large amounts of data become extremely slow.

In comparison to the present invention, most Internet applications (such as Real Audio, for example) the signaling (e.g., the number to dial) is done expressively by the application. In accordance with the present invention, the signaling information is handled without requiring the knowledge of the user or application.

System Overview

Referring to FIG. 1, the user 1 accesses the Internet via a dial-up connection 2 to a Point Of Presence terminal 3 server within the network 4. Through a series of routers 5, 6, the user can access an applications server 7 with data of interest to the user 1.

Once the user 1 has decided to download the data, according to the present invention, the applications server 7 that is to download the data determines the appropriate alternate path by which to transfer the information rather than the through the IP backbone. The applications server determines this by contacting the GARP server's database, which lists the optimum subnetwork for the specified user/POP terminal server. The alternate path could be a circuit switched path via ISDN lines, a QOS ATM network, another IP network that is RSVP enabled internally between routers, Frame Relay or other networks, for example.

Alternatively, the applications server can be instructed to send the data via a specified alternate path. This instruction can either be embedded in the request for the data (i.e., as in the connection management information transfer technique described above) or as a configuration operation (by the GARS described above). The applications server 7 then establishes the connection, e.g., an ISDN connection 9 to the circuit switched network 8. The circuit switched network then establishes a connection to the POP terminal server 3 via another ISDN line 10. At the POP terminal server 3, the data is multiplexed with IP data being sent to the user.

There are three approaches to connecting the alternate network 8 to the POP terminal server 3. In the first approach, the ISDN connection 10 to the POP terminal server 3 can be made as one of the many dial-up connections to the POP terminal server 3. The POP terminal server 3 can process many different telephone calls at once at its front end. Assuming there are lines available, the ISDN connection 10 from the circuit switched network 8 can be made via one of these telephone lines. The POP terminal server 3 then simply routes the incoming ISDN connection 10 to the user connection 11. Alternatively, this call could be passed to the first router 5, which would then reroute the call back to the POP terminal server 3 and on to the client 1.

One must use caution, however, in assigning too many telephone lines for this purpose as this connection is the only "entrance" to an IP service provider's "store." As many Internet service providers have learned, users become disillusioned with an IP service provider if they cannot even access it. Therefore, in attempting to create a solution to long delays in downloading data, one cannot create problems for users attempting to logon by allowing users already logged on to occupy two connections to the POP terminal server. This essentially would cut the number of access lines in half, assuming all users were downloading data. Thus, where limited telephone lines are available, this solution may be less than optimal.

A second approach is to connect the ISDN line 10 to the back end of the POP terminal server 3. The POP terminal server 3 then would connect the user connection 3 to the ISDN connection 10. While slightly more complex than the previous approach, this approach does not potentially use up scarce resources of the POP terminal server 3. This connection would be similar to any of the router 5 connections to the POP terminal server 3.

Yet another alternative if no incoming lines to the POP terminal server 3 are available is to connect the alternate network to another server within the IP network that is directly connected (or logically "closely connected") to the POP terminal server 3 so that there is very little delay added by the connection from the other server to the POP terminal server 3. This can also be referred to as the nearest neighbor. Usually, most delays are due to routers and concentrators that are overloaded with traffic. If you can avoid the traffic jams, you can significantly reduce the delay, especially where there is only one transfer as in this case. This approach avoids these "traffic jams" at these overloaded junctions. If the circuit switched network is itself overloaded, then the data path to the POP terminal server occurs in the normal fashion.

Depending on the type of network, one can expand this concept to include those closest servers that are only a few hops away. By setting a maximum limit on the number of routers between the POP terminal server 3 and the server that the circuit switched network is overloaded, one can at least limit the potential delays involved.

By improving the download time on the network side, the present invention enables an IP service provider to make available faster connections to the POP terminal server 3 as the speed increase will be actually noticed by users, rather than being an insignificant improvement in performance. If users can actually realize an improvement in performance, they are more likely to be willing to pay for it. As a result, tier pricing for higher capacity access lines can be significantly increased.

Figure 2:
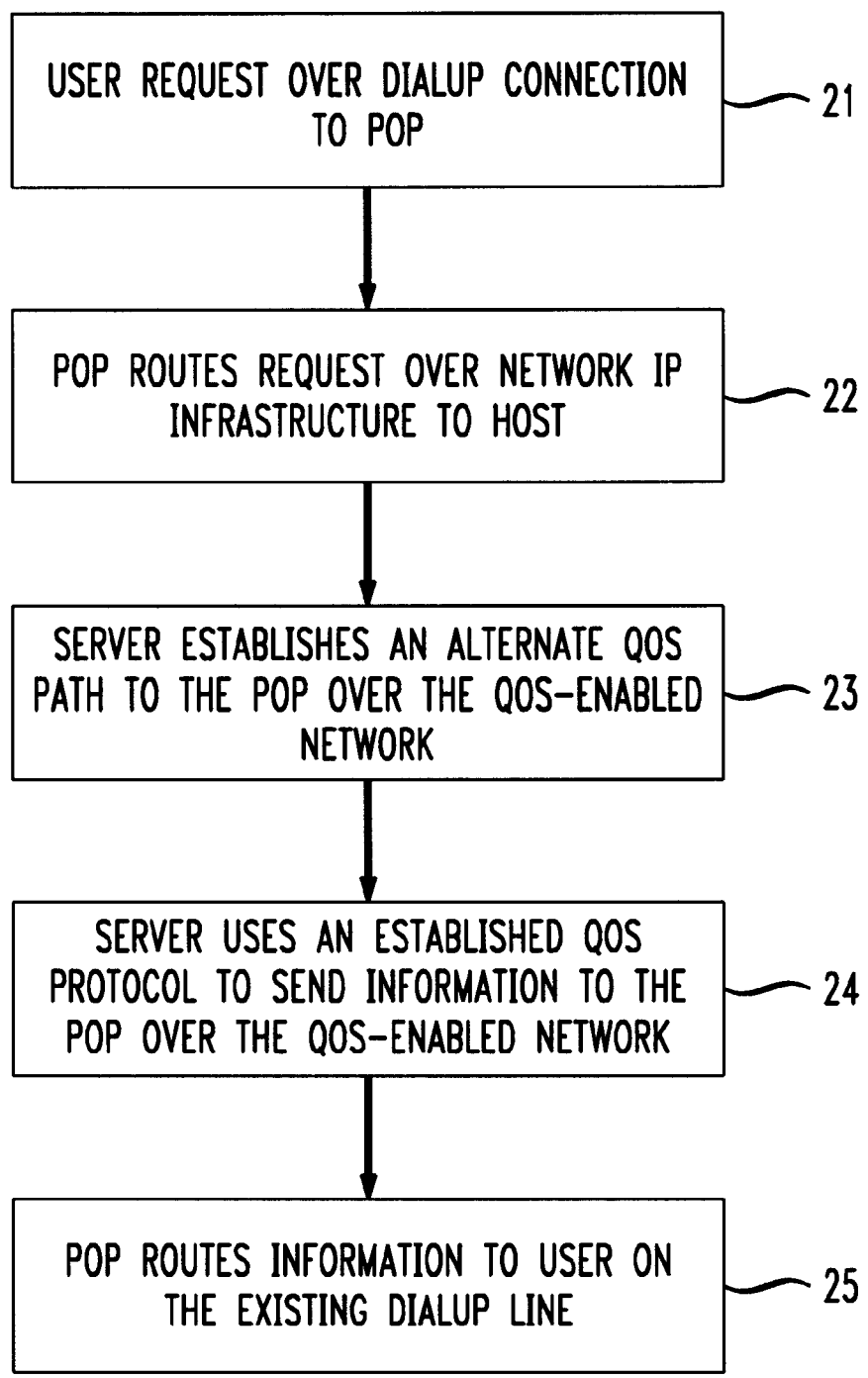
FIG. 2 depicts a flow chart of the method according to the present invention.

Turning to FIG. 2, the method 20 of the present invention is as follows. When the user requests certain data to be transferred to him or her, the request (i.e., the uplink information) comes through as usual using IP over a dialup connection to the terminal server at the access POP, as shown in step 21. The POP then routes this request over the network infrastructure to the Home-Page server or other URLs as applicable (see step 22). The Home-Page server(s) establishes an alternate QOS path, such as an ISDN path, back to the POP on a need-basis or pre-established basis, as in step 23. The Home-Page server uses an established QOS protocol to send the information back to the POP over the QOS-enabled network. (see step 24). The POP routes this information back to the user on the existing dialup connection, as shown in step 25.

Figure 3:
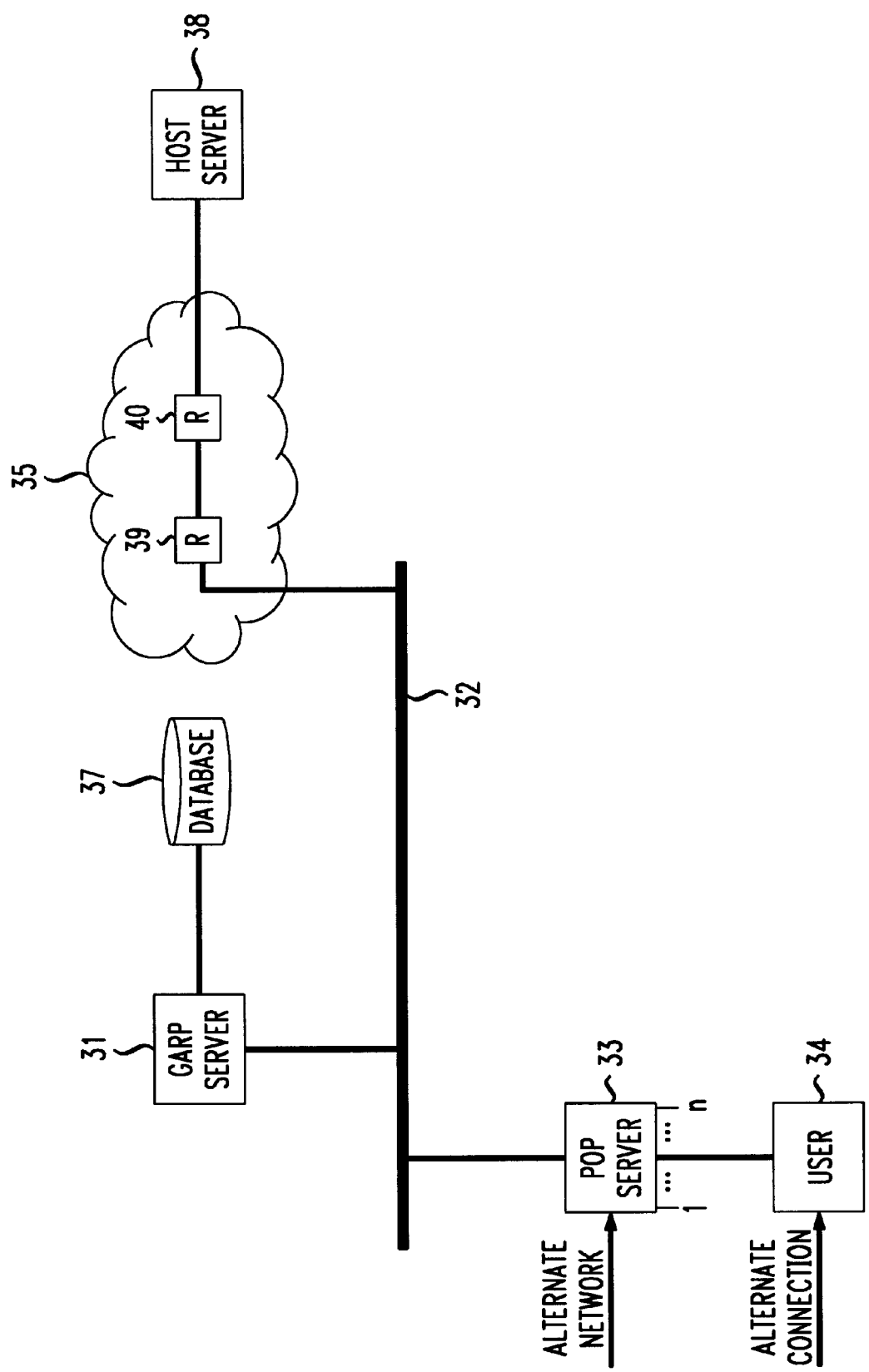
FIG. 3 depicts the interconnection of the Generalized Address Resolution Server according to the present invention.

Turning to FIG. 3, a Generalized Address Resolution Protocol Server 31 of the present invention is coupled to a Local Area Network (LAN) 32, to which a POP terminal server 33 could also be coupled. The POP terminal server 33 is coupled to the user 34, and is the route by which the user 34 accesses the Internet 35. The POP terminal server 33 has n connections, one of which is assigned to the user. The user accesses the POP terminal server using PPP protocol with a dial-up modem. The POP terminal server also has an alternate connection to it, such as an ISDN line, an QOS network, etc. When data is sent to the user 34 over the alternate connection, the POP terminal server uses the loop-back output (LO) to return the data to the POP terminal server, as if the data was coming from the LAN 32 or Internet 35. The data is then transmitted to the user in the normal fashion.

When the destination server desires to download data to the user, it contacts the GARP server 31, which indicates the best alternate path to the user. The GARP may be anywhere on the network, not just as shown as in FIG. 3. The GARP server 31 will maintain a database 37 of the appropriate return path in view of the above criterion, which is constantly in a state of flux. The return path indicator will instruct the destination server 38 to establish a path from itself 38 to the POP terminal server 33 along the designated path. As a result, the data downlink will be established independently of the IP network, if a QOS path exists.

What is claimed is:

1. A method for transferring data between a web access device and an applications server, wherein both, the web access device and the applications server are coupled to a Point of Presence server in a network, said method comprising the steps of:
   a) routing commands from the web access device to the applications server via the network;
   b) downloading data from the applications server to the Point of Presence server via a subnetwork having a predetermined quality of service, said downloading step being performed after accessing a database to determine the subnetwork via which the applications server is to download the data to the web access device; and
   c) selecting an optimum subnetwork from among a plurality of subnetworks, said selection being made according to a set of predetermined criteria.

2. The method according to claim 1, wherein said downloading step includes the step of:
   mapping an IP address to a subnet address, wherein the subnet address is a combination of the subnetwork and an address within the subnetwork for a machine identified by the IP address.

3. The method according to claim 1, further comprising the step of:
   accessing a server on the network on which is stored the database via which any device on the network can find out the optimum subnetwork when selecting a subnetwork to another device.

4. The method according to claim 1, wherein the predetermined criteria comprises:
   a) an ability of the available subnetworks to support the quality of service desired;
   b) a current traffic load on the available subnetworks;
   c) a price/payment for each of the available subnetworks; and
   d) time of day variations that the subnetworks experience.

5. The method according to claim 2, further comprising the step of storing the optimum subnetwork's identity in a database that is accessible by a server on the network.

6. The method according to claim 5, further comprising the step of dynamically updating the database based on a plurality of predetermined criteria.

7. The method according to claim 6, wherein the predetermined criteria comprises:
   a) an ability of the available subnetworks to support the quality of service desired;
   b) a current traffic load on the available subnetworks;
   c) a price/payment for each of the available subnetworks; and
   d) time of day variations that the subnetworks experience.

8. The method according to claim 2, further comprising the step of using a default IP network in the event that no alternate subnetwork is available.

9. The method according to claim 1, further comprising the step of:
   establishing a connection from the applications server to a circuit switched network and from the circuit switched network to a dial-up side of the Point Of Presence server.

10. The method according to claim 1, further comprising the step of:
    establishing a connection from the applications server to a circuit switched network and from the circuit switched network to a network side of the Point Of Presence server.

11. The method according to claim 1, further comprising the step of:
    establishing a connection from the applications server to a circuit switched network and from the circuit switched network to a neighboring server within the network, wherein the neighboring server includes a server that is logically close to the Point Of Presence server.

12. The method according to claim 1, further comprising the step of:
    establishing a connection from the applications server to a circuit switched network to a server having a predetermined maximum number of connections needed to reach the Point Of Presence server.

13. The method according to claim 1, wherein the alternate path is established from a network selected from a group of networks comprised of a) quality of service asynchronous transfer mode network, b) another IP network that is RSVP enabled internally between routers, c) a Frame Relay network, d) a POTS circuit switched network, and e) an ISDN network.

14. In a client-applications server networked environment, in which the Internet Protocol is implemented and the client is connected to the applications server through a terminal server and the client can request data from the applications server by sending commands to the applications server through the terminal server, a method for communicating between the client and the server comprising the steps of:
   a) separating a command path from a data path within the network; and
   b) transmitting data to the client from the applications server along the data path based upon a subnet address included in a command sent along the command path wherein the data path is external to the client-applications server network.

15. The method according to claim 14, wherein the command path comprises a path taken by a request to download data from the client to the applications server.

16. The method according to claim 14, wherein the data path is a circuit-switched connection from the applications server to the terminal server.

17. The method according to claim 14, wherein the data path is within the plain old telephone switched infrastructure using PPP protocol.

18. The method according to claim 14, wherein the command path is within the client-applications server network using IP protocol.

19. The method according to claim 14, further comprising the step of embedding signaling information in an HTTP request by a proxy server.

20. A method for interacting with an applications server by a client accessing the applications server via a Point Of Presence server, comprising the steps of:

a) transmitting a client request using Internet protocol to the Point Of Presence server;

b) routing the client request over a network to the applications server;

c) establishing an alternate path back to the Point Of Presence server using a different protocol;

d) downloading information to the Point Of Presence server using the alternate path and the different protocol; and e) routing the information from the Point Of Presence server to the client using the IP protocol.

21. The method according to claim 20, further comprising the step of:

establishing for said alternate path a connection from the applications server to a circuit-switched network and from the circuit-switched network to a dial-up side of the Point Of Presence server.

22. The method according to claim 20, further comprising the step of:

establishing for said alternate path a connection from the applications server to a circuit-switched network and from the circuit-switched network to a network side of the Point Of Presence server.

23. The method according to claim 20, further comprising the step of:

establishing for said alternate path a connection from the applications server to a circuit-switched network and from the circuit-switched network to a neighboring server within the network, wherein the neighboring server includes a server that is logically close to the Point Of Presence server.

24. The method according to claim 20, further comprising the step of:

establishing a connection from the applications server via the circuit-switched network to yet another server having a predetermined maximum number of connections needed to reach the Point Of Presence server.

25. A communications system for communicating data between an applications server and a client device, the applications server and the client device both being coupled to a first network which supports the IP protocol and which has a plurality of routers, said system comprising:

a) a Point Of Presence server which includes (1) a plurality of dial-up access ports, wherein one of the plurality of access ports is coupled to the client device via a dial-up connection; and (2) a plurality of router ports in said routers to which said Point Of Presence server to said applications server are coupled; and b) a database server coupled to the Point Of Presence server via said router ports, said database server storing a list of alternate paths for downloading data from the applications server to the Point Of Presence server, said list of alternate paths being dynamically updated based on a plurality of predetermined criteria.

26. The apparatus according to claim 25, wherein the alternate paths include at least one path which is established on a second network and which is selected from a group of networks which include a quality of service asynchronous transfer mode network, a separate IP network that is RSVP-enabled internally between routers, a frame relay network, a circuit-switched POTS network and a circuit-switched ISDN network.

27. A method of communicating information between a network access device and an applications server, comprising the steps of:

establishing a connection for communicating commands from said network access device to said applications server, said connection being established between said network access device and said applications server via a terminal server which is coupled to said applications server through a first communications network;

transmitting data which is destined for said network access device, from said applications server to said terminal server via a second communications network; and accessing a database to identify said second communications network for said data transmission, wherein said second communications network is selected from a group of networks which include an ATM network, a frame relay network and a circuit-switched network.

28. The method of claim 27 wherein said first communications network is a packet-switched network and said second communications network is a circuit-switched network.

* * * * *